United States Patent [19]

Fournier

[11] Patent Number: 4,733,874
[45] Date of Patent: Mar. 29, 1988

[54] NUT AND SEAL ASSEMBLY

[76] Inventor: Bruce Fournier, 27510 Loma Prieta Way, Los Gatos, Calif. 95030

[21] Appl. No.: 744,035

[22] Filed: Jun. 12, 1985

[51] Int. Cl.⁴ .......................... F16J 15/16; F16J 15/32
[52] U.S. Cl. .................................... 277/110; 277/153; 74/574.2
[58] Field of Search .............................. 277/110–112, 277/152, 153; 474/903; 74/594.2

[56] References Cited

U.S. PATENT DOCUMENTS

| Re. 15,061 | 3/1921 | Cantrell et al. | 277/153 |
|---|---|---|---|
| 582,750 | 5/1897 | Leaycraft | 74/594.2 |
| 601,710 | 4/1898 | Fay | 74/594.2 |
| 3,871,665 | 3/1975 | Burke et al. | 277/153 |
| 4,519,636 | 5/1985 | Tomlin et al. | 277/12 |

FOREIGN PATENT DOCUMENTS

| 26961 | of 1896 | United Kingdom | 277/110 |
|---|---|---|---|
| 550312 | 1/1943 | United Kingdom | 277/153 |
| 604704 | 7/1948 | United Kingdom | 277/153 |
| 648677 | 1/1951 | United Kingdom | 277/153 |

*Primary Examiner*—Robert S. Ward
*Attorney, Agent, or Firm*—William W. Burns

[57] ABSTRACT

An assembly designed for use on the main drive gear output shaft of a motorcycle, and in similar applications, and including a seal which is press fitted into the cavity of a nut. The nut and seal combination is concentrically positionable over the output shaft, and the seal includes a rubber skirt having a spring positioned around its periphery. The spring maintains the skirt in contact with the output shaft to thus create the seal.

7 Claims, 3 Drawing Figures

NUT AND SEAL ASSEMBLY

BACKGROUND OF THE INVENTION

1. Field of the Invention

The present invention relates to seals for preventing leaks around shafts, and the like, and more particularly pertains to a new and improved nut and seal combination particularly well suited for use on the main drive gear output shaft of a motorcycle.

2. Description of the Prior Art

There are numerous conventional sealing assemblies which are commercially available and which are specifically designed for preventing oil leaks from transmissions at the point where the output shaft exits the transmission housing. In this respect, oil leaks are quite common between the main drive gear and the output shaft with such leaks commonly occurring at the bushing in the main drive gear. Typically, a bushing and seal assembly is press fitted around the output shaft at its connection point with the main drive gear, and a locking nut is then utilized to retain the bushing and seal assembly in place. Quite commonly, these bushing and seal assemblies deteriorate rapidly inasmuch as no particularly well designed means is currently available for retaining the polymeric seal material in contact with the output shaft for an extended period of time. Normal fatigue and aging results in an expected deformation of the seal material, which then normally results in increased oil leakage. As can be appreciated then, there is a continuing need for new and improved seal assemblies for output shafts wherein the components thereof are less susceptible to deterioration and deformation over extended use periods, and in this respect, the present invention substantially fulfills this need.

SUMMARY OF THE INVENTION

The general purpose of the present invention, which will be described subsequently in greater detail, is to provide a new and improved nut and seal assembly for substantially reducing transmission oil leaks in motorcycles, wherein such assembly has all of the advantages of prior art sealing assemblies and none of the disadvantages. To attain this, the present invention envisions the use of a shaft nut having an interior cavity into which a metallic seal may be press fitted. The interior circular portion of the metallic seal includes a polymeric gasket having a double lip for sealing contact with a transmission output shaft with a portion of the polymeric seal being shaped as a skirt around which a spring is fittingly engaged. The spring forces the skirt of the polymeric seal into tight sealing contact with the output shaft.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures for carrying out the several purposes of the present invention. It is important, therefore, that the claims be regarded as including such equivalent constructions so far as they do not depart from the spirit and scope of the present invention.

As such, it is an object of the present invention to provide a new and improved nut and seal assembly which has all of the advantages of the prior art transmission seal assemblies and none of the disadvantages.

It is another object of the present invention to provide a new and improved nut and seal assembly which may be efficiently and easily manufactured and marketed.

It is a further object of the present invention to provide a new and improved nut and seal assembly which may be efficiently and reliably assembled and used in a rapid manner.

Even another object of the present invention is to provide a new and improved nut and seal assembly which is of a durable and rugged construction.

Still another object of the present invention is to provide a new and improved nut and seal assembly wherein the elements thereof are resistant to deterioration, wear and deformation.

Still yet another object of the present invention is to provide a new and improved nut and seal assembly which is characterized by a portable and lightweight construction whereby the same can be conveniently transported, stored and assembled.

An even further object of the present invention is to provide a new and improved nut and seal assembly which is susceptible of a low cost of manufacture with regard to both materials and labor, and which accordingly is then susceptible of low prices of sale to the consuming public, thereby making such devices economically available to the buying public.

Even still another object of the present invention is to provide a new and improved nut and seal assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
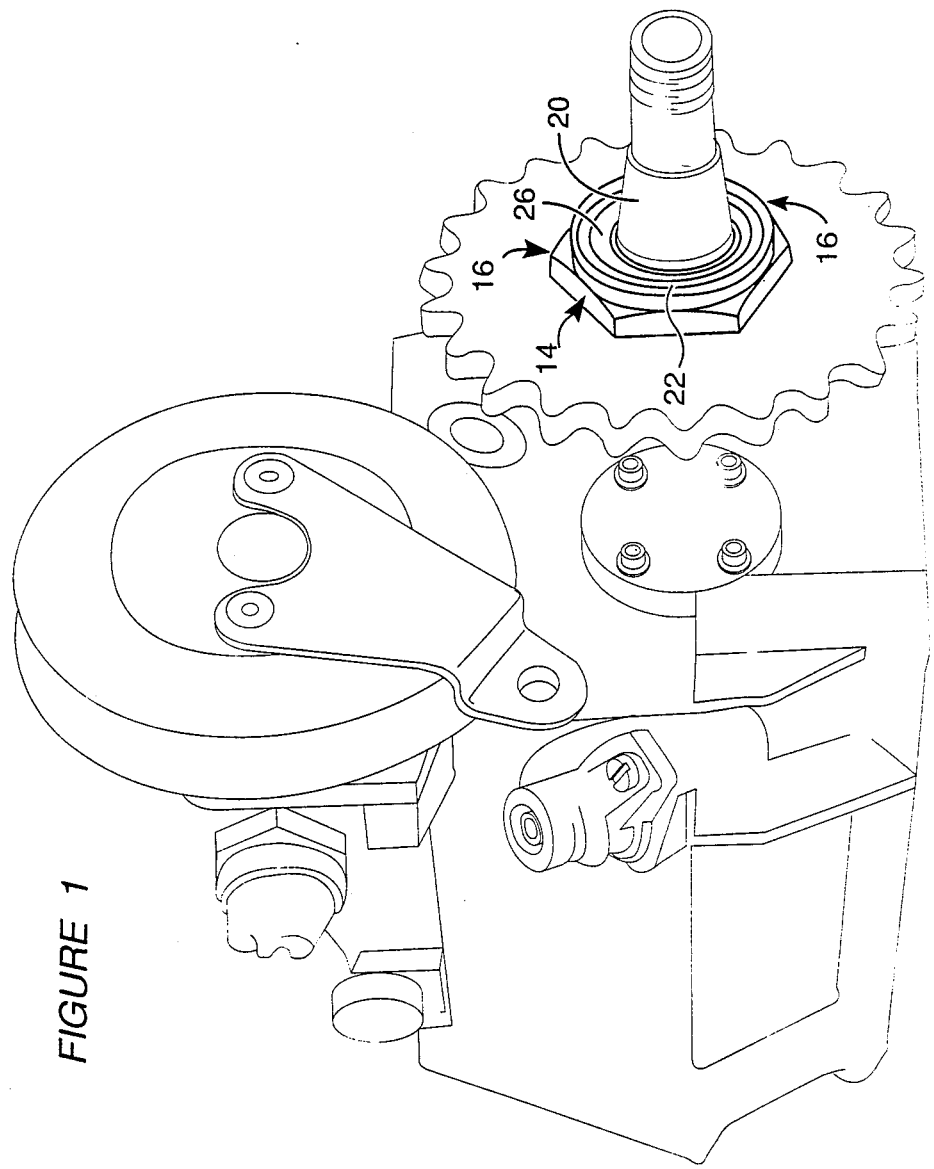
FIG. 1 is a perspective view of the nut and seal assembly forming the present invention showing the same operably attached to a motorcycle transmission output shaft.
Figure 2:
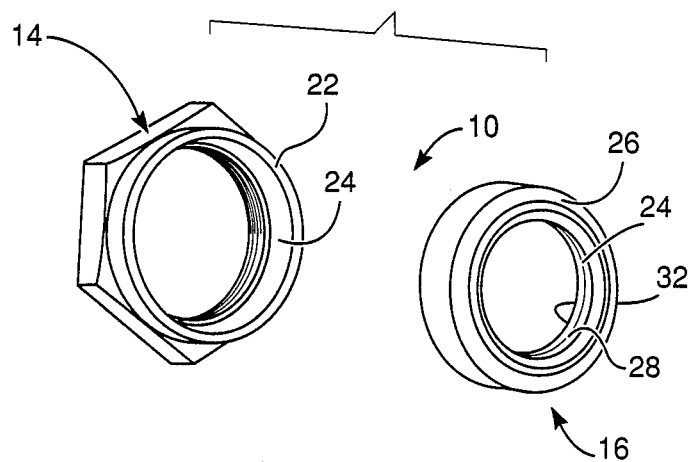
FIG. 2 is an exploded front perspective view of the invention.
Figure 3:
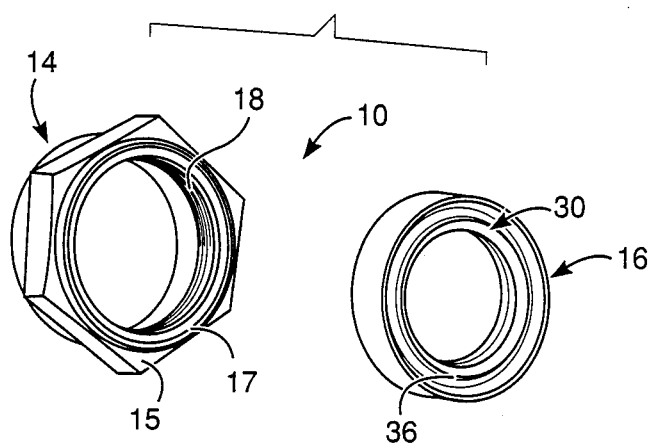
FIG. 3 is an exploded rear perspective view of the invention.

With reference now to the drawings and in particular to FIGS. 1–3 thereof, a new and improved nut and seal assembly embodying the principles and concepts of the present invention and generally designated by the reference numeral 10 will be described. In this respect, it is to be noted that the invention 10 is essentially comprised of two separable components, i.e., a retainer nut 14 and a seal assembly 16 which may be press fitted thereto.

As illustrated, the retainer nut 14 will typically be of a hexagonal construction and may include an interior threaded portion 18 which facilitates the threaded attachment of the nut to a conventional transmission housing through which an output shaft 20 extends. In the preferred embodiment the nut includes a rear face 15 which meets in abutting engagement with a housing. Optionally the nut includes a circular groove 17 in which a polymeric O-Ring is secured to provide sealing engagement with said housing. As more clearly illustrated in FIG. 2, a front portion of the retainer nut 14 includes an extended integral cylindrical section 22 which has a smooth surfaced interior bore 24. The interior section 24 is of a diameter substantially similar to the outside diameter of the aforementioned metallic seal assembly 16.

With reference to the construction of the seal assembly 16, it will be noted that the same includes an outer metallic annular section 26 having an L-shaped cross-section. When installed in the nut a first leg of the annular section extends axially in frictional engagement into the cavity toward the rear face 15, the second leg thereof extending radially inwardly at the inception of the front portion to describe a circular opening therein. A polymeric elastically-deformable member 28 is fixedly secured on the edge of said circular opening. The polymeric member 28 may be attached to the metallic member 26 by any known and conventional means, such as by frictional engagement, gluing, etc. As such, all conceiveable attachment means are within the intent and purview of the present invention.

As most clearly shown in FIGS. 2 and 3 of the drawings, the interiorly positioned polymeric seal member 28 is designed with an axially extending skirt 30 and includes two radially, inwardly directed flexible sealing lips 32, 34. Both of the sealing lips 32, 34 are designed for tight frictional engagement with the output shaft 20 so as to form a leakproof seal between the transmission housing and the aperture through which the output shaft 20 extends. As best shown in FIG. 3, a further unique feature of the present invention is the use of a continuous circular retaining spring 36 which is positionable about an outside dimension of the polymeric skirt 30 so as to further effect a gripping engagement of at least the lip 32 in contact with the output shaft 20. The spring 36 thus operates to maintain frictional engagement of the polymeric member 28 with the output shaft 20, while also operating to prevent deformation of the polymeric seal over an extended period of time, thus to substantially lengthen the operable life of the seal assembly during which little or no oil leakage will occur therethrough.

While the manner of usage of the above-described invention should now be apparent, a brief summary thereof will be provided. In this respect, it can be appreciated that the retainer nut 14 is first threadably secureable to a transmission housing an output shaft 20, such as present on a motorcycle, or the like, and the seal assembly 16 may then be frictionally engaged with the retainer nut by press fitting the same within the extended conduit section 22. In this respect, the outer section 26 of the seal assembly 16 is frictionally engaged within the interior portion 24 of the retainer nut 14, while the output shaft 20 extends through the central opening of the seal assembly. Once positioned, the retainer spring 36 operates to bring the polymeric member 28 and lips into close frictional engagement with the output shaft 20 by providing continuous engagement irrespective of deviations in the surface of the output shaft thereby to prevent oil leakage from the transmission.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the priciples of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved nut with seal assembly for preventing liquid leakage around an output shaft extending from a housing, said assembly comprising: A retainer nut, having a rear face in abutting engagement with said housing, and an extended front portion including a cylindrical cavity therein, concentrically positionable over said output shaft;

A seal member having a rigid annular member for frictional engagement in said cavity, a flexible annular gasket member secured to one end of said rigid member, said gasket member including a skirt member axially extending toward said rear face and including lip means extending radially inward from said skirt, and spring means surrounding said skirt to bias said lip means into sealing contact with said shaft.

2. The nut and seal assembly for preventing liquid leakage as described in claim 1, wherein said retainer nut includes an interiorly threaded portion for attachment of said nut to said housing.

3. The nut and seal assembly for preventing liquid leakage as described in claim 2, wherein said annular member has an L-shaped cross-section with the first leg of the L extending axially in frictional engagement into the cavity and the second leg extends radially inwardly at the inception of the front portion of the nut to describe a circular opening therein.

4. The nut and seal assembly for preventing liquid leakage as described in claim 3, wherein said rigid annular member is composed of metal and said gasket member is composed of polymeric material.

5. The nut and seal assembly for preventing liquid leakage as described in claim 4, wherein said lip means comprise two concentric spaced lips for flexible sealing contact with said shaft.

6. The nut and seal assembly for preventing liquid leakage as described in claim 5, wherein said spring means comprises a metallic or plastic coil spring surrounding said skirt member to retain at least one lip for continuous frictional sealing engagement with said shaft.

7. The nut and seal assembly for preventing liquid leakage as described in claim 6, wherein said rear face includes a circular groove with a polymeric O-Ring secured therein for abutting sealing engagement with said housing.

* * * * *